(12) United States Patent  
Gutierrez

(10) Patent No.: US 7,972,070 B1  
(45) Date of Patent: *Jul. 5, 2011

(54) IMPULSE ACTUATED MEMS DEVICES

(75) Inventor: Roman C. Gutierrez, Arcadia, CA (US)

(73) Assignee: Tessera MEMS Technologies, Inc., Arcadia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/901,440

(22) Filed: Oct. 8, 2010

Related U.S. Application Data

(63) Continuation of application No. 11/854,806, filed on Sep. 13, 2007, now Pat. No. 7,832,948.

(51) Int. Cl.  
*G03B 9/00* (2006.01)  
*G02F 1/00* (2006.01)

(52) U.S. Cl. ......................... 396/461; 396/457

(58) Field of Classification Search .......... 396/457, 396/461

See application file for complete search history.

(56) References Cited

U.S. PATENT DOCUMENTS

| | | | |
|---|---|---|---|
| 4,088,405 A | 5/1978 | Pustka et al. | |
| 4,407,576 A | 10/1983 | Joseph | |
| 4,778,254 A | 10/1988 | Gilliland et al. | |
| 5,025,346 A | 6/1991 | Tang et al. | |
| 5,159,382 A | 10/1992 | Lee et al. | |
| 5,606,387 A | 2/1997 | Furlani et al. | |
| 5,640,133 A | 6/1997 | MacDonald et al. | |
| 5,895,852 A | 4/1999 | Moriya et al. | |
| 5,986,381 A | 11/1999 | Hoen et al. | |
| 6,017,770 A | 1/2000 | Ghosh et al. | |
| 6,123,468 A | 9/2000 | Furlani et al. | |
| 6,308,573 B1 | 10/2001 | Lee et al. | |
| 6,541,892 B2 | 4/2003 | Hoen | |
| 7,832,948 B1 * | 11/2010 | Gutierrez | 396/461 |

* cited by examiner

*Primary Examiner* — Rodney E Fuller  
(74) *Attorney, Agent, or Firm* — Haynes and Boone, LLP

(57) ABSTRACT

An impulse actuated device for, e.g., an optical element of a digital camera, includes an elongated flexure having a first end upon which the optical element is disposed, and an opposite second end fixed so as to constrain the element to move along an arcuate, relatively long first trajectory between opposite initial and final positions, and a short-throw, high force element actuator that includes a stator and a stage supported for movement relative to the stator and along a second trajectory intersecting the first trajectory at the initial position of the element, and an apparatus for accelerating the stage along the second trajectory and against the element such that at least some of the momentum of the stage is imparted to the element and causes the element to move along the first trajectory and from the initial position to the final position.

24 Claims, 5 Drawing Sheets

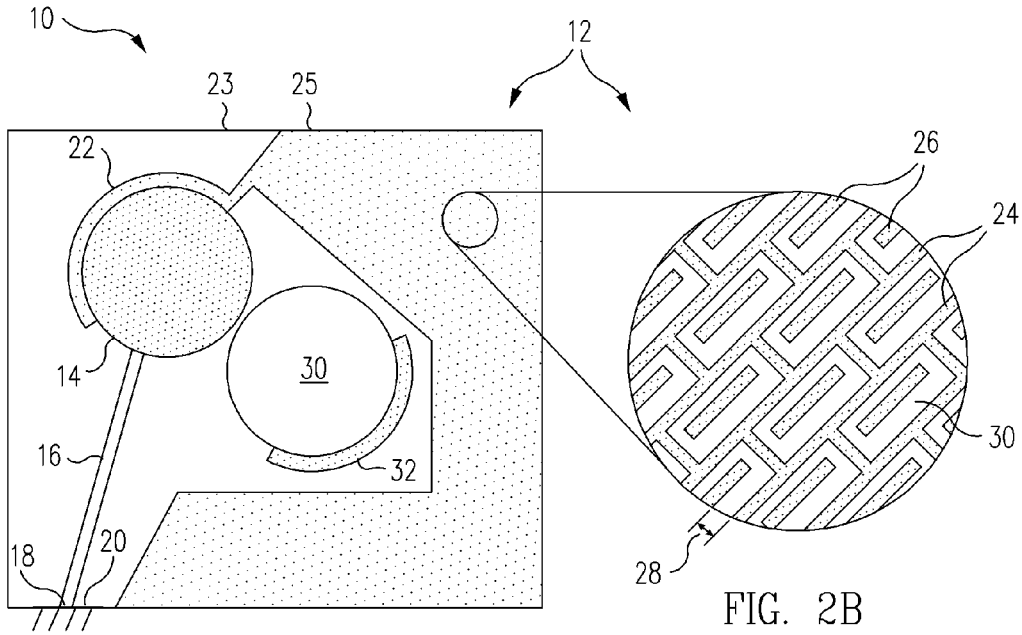
FIG. 2A
FIG. 2B
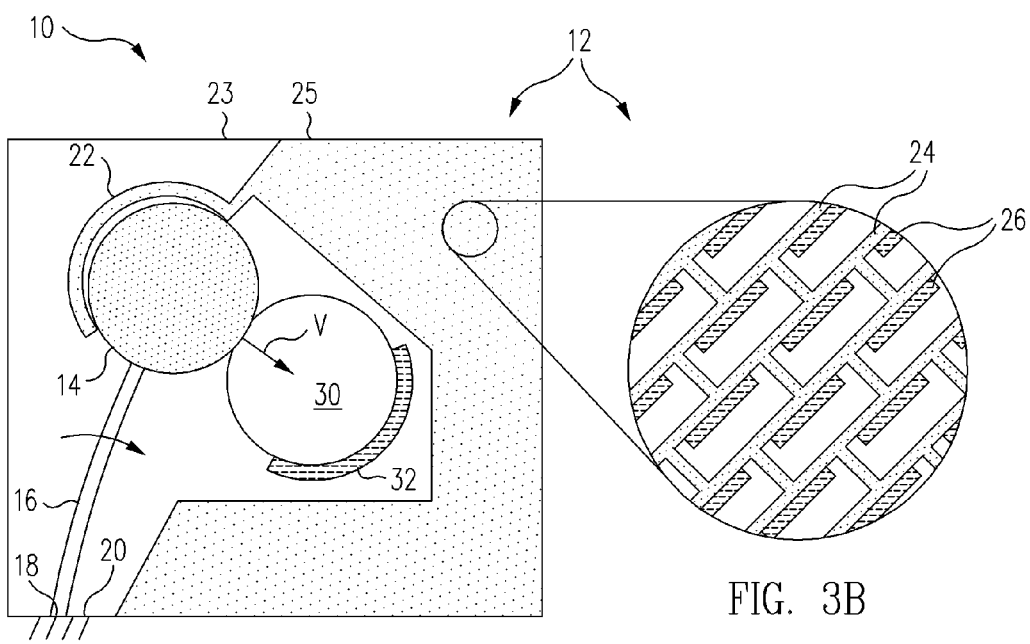
FIG. 3A
FIG. 3B

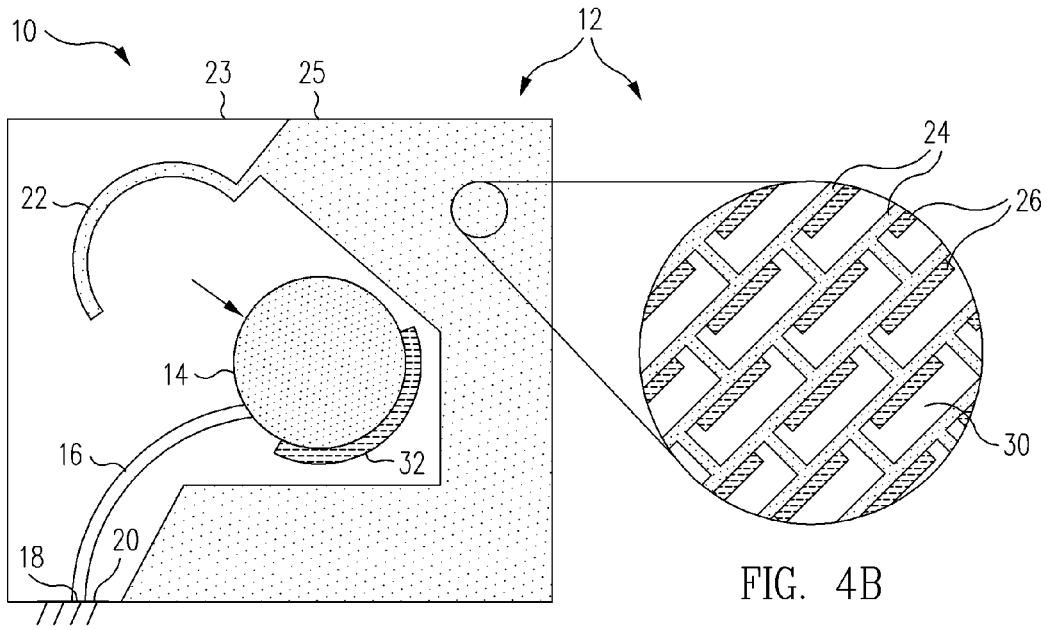
FIG. 4A
FIG. 4B
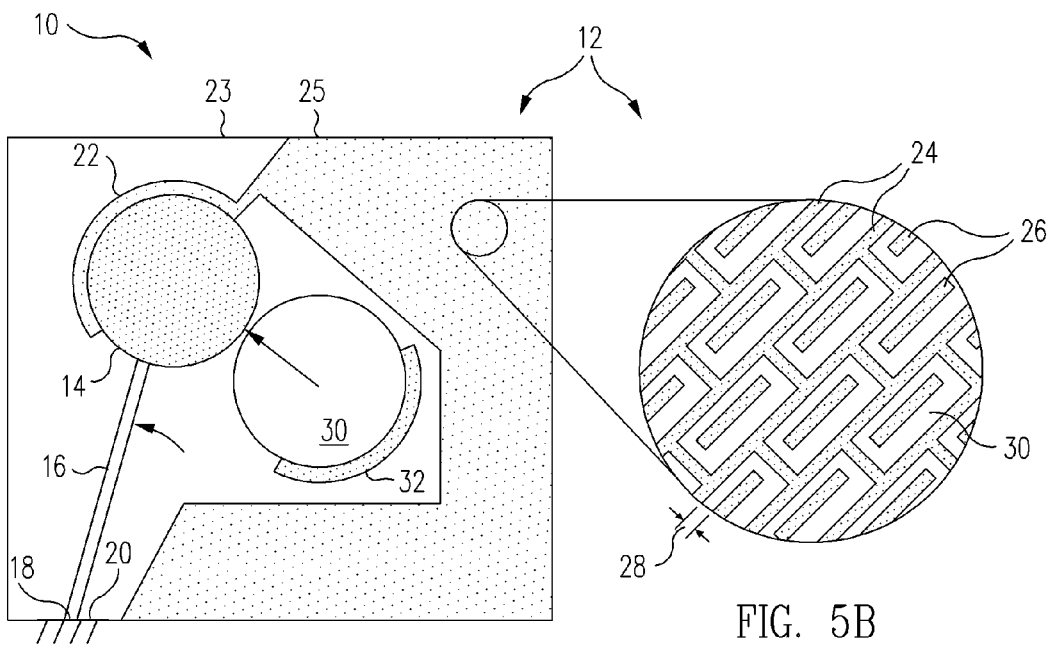
FIG. 5A
FIG. 5B

IMPULSE ACTUATED MEMS DEVICES

CROSS-REFERENCE TO RELATED APPLICATIONS

This continuation patent application claims priority to and the benefit of U.S. patent application Ser. No. 11/854,806, filed Sep. 13, 2007, now U.S. Pat. No. 7,832,948, issued Nov. 16, 2010, which is incorporated herein by reference in its entirety.

BACKGROUND

This disclosure relates to micro-electromechanical system (MEMS) devices, in general, and in particular, to impulse-actuated MEMS shutters for miniature cameras.

In the familiar arcade game of "pinball," momentum transfer is used to launch the game ball into play. Typically, a plunger having a specific mass is pulled back against the bias of a spring, and then released, causing the plunger to accelerate forward rapidly until it comes into contact with a stationary ball. Alternatively, the plunger can be rammed forward against the ball rapidly, e.g., with the heel of the hand. In either case, when the plunger contacts the ball, the momentum, or kinetic energy, of the moving plunger is transferred to the ball, causing it to separate from the plunger and accelerate rapidly forward in a desired trajectory. This basic principle can be used advantageously to actuate high-speed, miniature MEMS camera shutter mechanisms and the like through the use of highly efficient, high force, short-travel shutter blade actuators.

Miniature digital cameras are currently available with many electronic devices, such as cellular telephones, laptop computers, personal digital assistants (PDAs), and the like. Miniature cameras are also available as stand-alone devices for applications such as security and surveillance. Consequently, the market for such cameras is rapidly expanding. For example, camera-equipped cell phones now comprise a significant portion of the cell phone market. However, available miniature cameras may not be optimal for some applications.

Camera shutters control the transmission of light from a subject that passes through the camera's optical system to impinge upon a photo-sensitive material, e.g., a film containing silver iodide. In a conventional film (i.e., non-digital) camera, the shutter is positioned along the axis of the camera optics prior to film exposure, and prevents light from passing through the optics to the film. To initiate the exposure process, the user presses a shutter button, and responsively, the shutter moves to a position that allows light to pass through the camera optics to the film, and film exposure begins. After the desired exposure time has elapsed, the shutter moves back to the initial position so as to obscure the passage of light through the camera optics. Film advance mechanisms then move the exposed film away from the exposure position, while unexposed film is moved to the exposure position to be exposed at a later time.

Unlike film cameras, digital cameras need not include a mechanical shutter. Instead, shuttering may be performed electronically. However, some digital camera systems use a mechanical shutter in addition to electronic shuttering for, e.g., ensuring that the entire image is captured simultaneously and does not suffer from movement distortion. FIG. 1 shows an example of such a mechanical shutter mechanism 100 for a digital camera, according to the prior art.

The shutter mechanism 100 includes a mechanical shutter blade 130 with a pivot pin 135 and an actuator 140. The shutter mechanism 100 is included as part of a digital camera 110, which has a light aperture 120 configured to receive light to be processed to generate image information for an exposure. It should be noted that the term "exposure" in the context of digital photography refers to the time during which light is received for the photoelectric formation of a particular digital image, rather than a time during which film is exposed photochemically.

The digital camera 110 includes a controller (not illustrated) and a digital imaging system (not illustrated), such as a Complementary Metal-Oxide Semiconductor (CMOS) system or a Charge Coupled Device (CCD) imaging system, in place of conventional film. Received light corresponding to a matrix of image pixels is processed to generate a digital image, which is then stored in a memory device, such as an EEPROM.

In contrast to the conventional film camera described above, the shutter 130 of the digital camera 110 is initially positioned away from the aperture 120. The user pushes a button 125 to begin the exposure. In response, the controller resets the pixels of the digital imaging system to begin digital image data acquisition. At the end of the exposure time, the shutter 130 is then moved in front of the aperture 120 so as to block the passage of light through it and thereby end image data acquisition. In order to move the shutter 130, a force is applied using an actuator 140 that rotates the shutter 130 about the pivot point created by the pivot pin 135. After a short time, the actuator force is reversed, so that the shutter 130 moves back to its initial position away from the aperture 120.

Thus, in order to block the light entering the camera 110 at the end of the exposure, the shutter mechanism 100 must move a shutter "blade" disposed at the end of the shutter 130 through a distance sufficient to completely obscure the light aperture 120. This distance is typically relatively large and on the order of the size of the aperture. Conventional shutters have an actuator that applies a force that is nearly constant throughout the travel of the blade, and therefore, actuators with relatively large travel, or "throw," are used. However, actuation force is typically inversely proportional to the travel range, so that it is difficult to achieve an efficient actuator that can move the required distance. Prior art shutters therefore typically use electromagnetic actuators to achieve sufficient force and long "throw," or travel. However, these actuators consume large amounts of power, are relatively large, and are not amenable to efficient, precision MEMS fabrication technologies.

Accordingly, a need exists for shutter mechanisms incorporating a short-throw, but high-force actuator that can be used to accelerate a miniature camera shutter blade through a relatively long throw, or distance at a relatively high speed, and that is also amenable to fabrication using efficient MEMS fabrication technologies.

BRIEF SUMMARY

In accordance with the exemplary embodiments disclosed herein, compact, low-power, short-throw, and high-force shutter blade actuators are provided for miniature cameras that are advantageously amenable to efficient MEMS fabrication techniques and that overcome the above and other problems of the prior art by separating the actuation problem from the blade travel problem, and in which the short range, high force actuators are used to accelerate the shutter blades by transferring the momentum of the actuator to the blade, and in which the blade then separates from the actuator and travels a relatively long distance without further application of actuation forces to it.

In one example embodiment, an impulse actuated MEMS device comprises an element disposed at a first end of an elongated flexure having an opposite second end fixed so as to constrain movement of the element along a first trajectory and between opposite initial and final element positions, an actuator comprising a stator and a stage supported for movement relative to the stator along a second trajectory intersecting the first trajectory at the initial element position and between opposite initial and final stage positions, and an apparatus for accelerating the stage along the second trajectory and against the element such that at least some of the momentum of the stage is imparted to the element and causes the element to move away from the stage, along the first trajectory, and from the initial element position to the final element position.

A better understanding of the above and many other features and advantages of the impulse shutter actuators and mechanisms of the present invention may be obtained from a consideration of the detailed description below of some exemplary embodiments thereof, particularly if such consideration is made in conjunction with the appended drawings, wherein like reference numerals are used to identify like elements illustrated in one or more of the figures thereof.

BRIEF DESCRIPTION OF THE DRAWINGS

FIGS. 2A-5B are schematic elevation views of an exemplary embodiment of an impulse actuated MEMS camera shutter mechanism in accordance with the present invention, showing sequential stages of the actuation of a shutter blade thereof by an actuator thereof;

DETAILED DESCRIPTION

Figure 1:
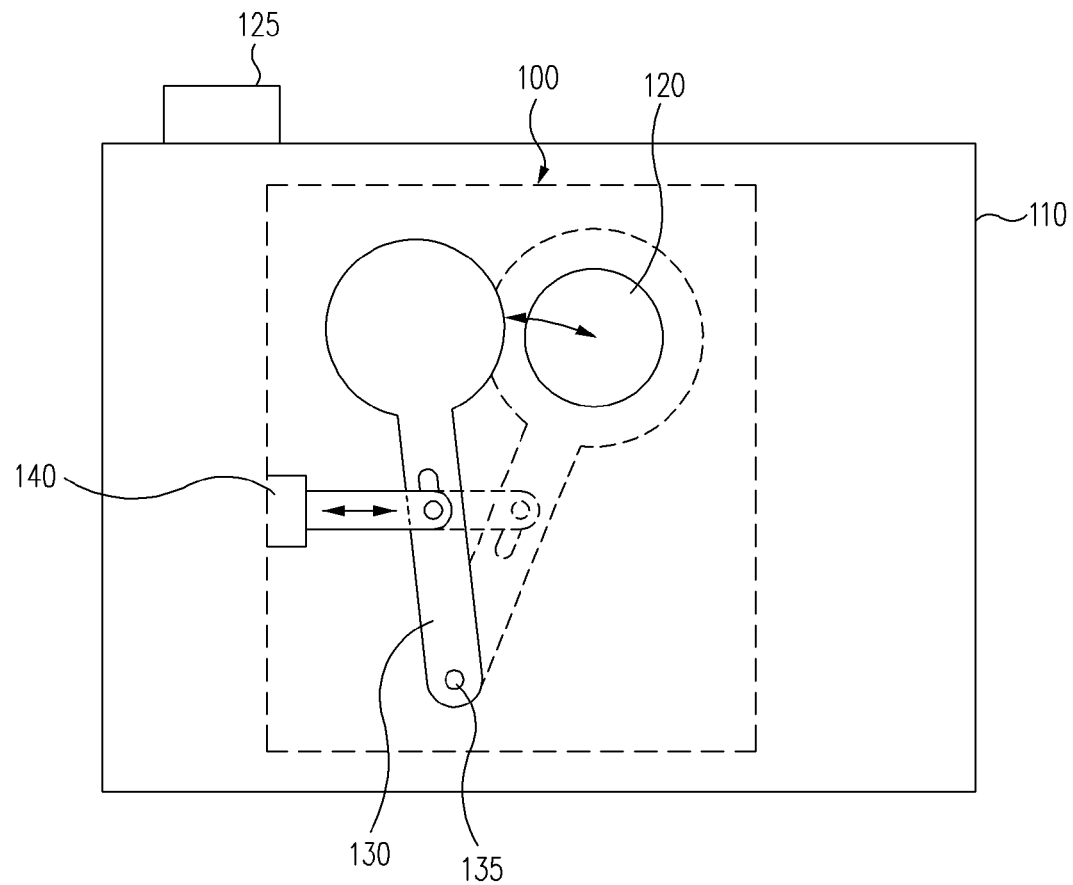
FIG. 1 is schematic elevation view of a digital camera shutter mechanism in accordance with the prior art.

Micro-electromechanical Systems (MEMS) actuators have widespread application in many fields, e.g., inertial sensors, variable capacitors, machine controls and micro-miniature cameras. These actuators typically comprise a fixed base, or "stator" portion, and a moveable translator, or "stage" portion that moves in a rectilinear or arcuate fashion relative to the stator in response to, e.g., electrostatic forces imposed between the stator and the stage. The forces may be effected through, in the case of electrostatic devices, charged planar electrodes disposed on opposing surfaces of the stator and the stage, such as described in, e.g., U.S. Pat. Nos. 5,986,381 and 6,541,892 to S. T. Hoen et al. Alternatively, the electrostatic forces may be effected through "comb" structures, i.e., interdigitated fingers formed on respective ones of the opposing sides or surfaces of the stator and stage, such as are described in, e.g., U.S. Pat. Nos. 6,308,573 to K. B. Lee; 5,895,852 to K. Moriya et al.; 5,640,133 to N.C. MacDonald et al.; and, 5,025,346 to W. C. Tang et al., the teachings of which are incorporated herein by reference.

Other types of actuators that use other forms motive power, e.g., pneumatic, hydraulic, electromagnetic, piezoelectric, magnetostrictive effects, and the like, are also well known in the art.

In such actuator devices, it is desirable to achieve, as closely as possible, a frictionless, typically planar motion of the stage relative to the stator. To effect this, the stage is typically suspended relative to the stator by means of one or more "flexures," i.e., elongated, resilient suspension mechanisms that space the stage apart from and parallel to the stator and control the trajectory of its travel relative to the stator such that the stage follows the desired trajectory throughout its entire range of travel. In the case of macro-machines or miniaturized mechanisms, it is relatively straightforward to confect such suspensions through, e.g., pinned hinge assemblies. However, in the case of micro-machined MEMS devices, such assemblies are impractical, and accordingly, the stage suspension mechanisms typically rely on the bending, or flexure, of elongated, resilient arms, or "flexures," and so-called solid, "resilient hinge" attachments.

Systems and techniques for using flexures and resilient hinges, or "virtual pivots" in shutter mechanisms for miniature cameras that can be efficiently fabricated using MEMS technology are described in co-pending U.S. patent application Ser. No. 11/365,790 by R. Gutierrez and R. Calvet, filed Feb. 28, 2006, the entire disclosure of which is incorporated herein by reference.

The present invention provides shutter mechanisms for miniature digital cameras of a type commonly found in, e.g., modern cell phones, in which a compact, low-power, short-throw, yet relatively high-force shutter blade actuator, which is amenable to efficient MEMS fabrication techniques, and which is used to accelerate the shutter blade from a first, or "open," position by transferring the momentum of the actuator to the blade, and in which the blade then separates from the actuator and travels through a relatively long trajectory without further involvement of the actuator, except optionally, to arrest and temporarily hold the shutter blade in a second or "shut" position for a selected period of time.

FIG. 2A illustrates a first exemplary embodiment of an impulse-actuated MEMS shutter mechanism 10 in accordance with the present invention, wherein an electrostatic actuator 12 is used to drive a shutter blade 14 of the mechanism so as to completely obscure a light aperture 30 of, e.g., a digital camera (not illustrated). The shutter blade is suspended by a first flexure 16 that confines its movement to a predefined first trajectory having initial and final shutter blade positions. In particular, the lower end 18 of the flexure is integrally formed with a supporting structure 20, e.g., a silicon substrate from which the shutter blade and the flexure are both integrally micro-machined, as by photolithography and etching, such that it is fixed thereto, and accordingly, forms a resilient hinge, or virtual pivot thereat. Accordingly, the shutter blade, which is integrally formed at the upper end of the flexure, follows an arcuate first trajectory as the flexure bends, or flexes about its lower end, as illustrated in FIGS. 3A and 4A.

The electrostatic actuator 12 comprises a stationary, planar "stator" part 23 and a planar stage part 25 supported above and parallel to the stator 23 for movement relative to the stator 23 and along a second trajectory coplanar with the blade 14 and between opposite initial and final stage positions. Each of the stator 23 and the stage 25 has a plurality of planar electrodes 24 and 26 respectively disposed on opposing surfaces thereof, as illustrated in FIGS. 2B, 3B, 4B and 5B.

As discussed above, the electrodes 24 and 26 may comprise planar electrodes formed on the respective opposing surfaces of the stator 23 and the stage 25, or alternatively, upstanding blade or comb structures, i.e., interdigitated "fingers," formed on respective ones of the opposing surfaces, and in either case, defining a plurality of complementary actuator cells 30 which, operating in concert, are operable to accelerate the stage 25 to movement in a plane parallel to the stator 23.

At the beginning, or initial position, of the first trajectory of the shutter blade 14, the blade is positioned in contact with a first receptacle, or blade impeller 22, i.e., the second trajectory of the stage 25 intersects the first trajectory of the blade 14, at least when each of the blade 14 and stage 25 is disposed in its respective initial position. As illustrated in the enlarged detail views of FIGS. 2B, 3B, 4B and 5B, the first receptacle 22 is attached to the moving part, i.e., the stage 25 of the electrostatic actuator 12, that moves relative to the fixed part thereof, i.e., the stator 23. The stage 25 of the actuator is confined to motion between initial and final positions along a second trajectory that is coplanar with, but much shorter than, the first trajectory by one or more second flexures (not illustrated), such that the total travel, or "throw," of the moving part 25, including the integral first receptacle 22, along the second trajectory between its initial and final positions is substantially less than the total travel of the shutter blade 14 along the first trajectory between its initial and final positions.

FIG. 3A illustrates an initial stage in the actuation of the shutter mechanism 10. When a voltage giving rise to an electrostatic charge is placed on the electrodes 24 of the stationary part 23 of the actuator 12, the moving part 25 of the actuator, which is grounded, is attracted to and contracts rapidly toward, the stationary part 23, such that it attains a relatively large velocity before coming in contact with the stationary part. For example, in one exemplary embodiment, if the gap 28 between the electrodes 26 and 24 of the moving and stationary parts 25 and 23 of the actuator cells 30 is 2 µm, and assuming 200 actuator cells in the actuator, each having an area of 100 µm×1 mm, and an applied driving voltage of 30 VDC, the resulting impulse force applied to the stage or moving part 25 of the actuator, and hence, the first receptacle 22 and shutter blade 14, is about 20 mN. Responsively, if the total mass of the stage 25 of the actuator and the shutter blade 14 is 1 mg, the resulting impulse, or acceleration, imparted to the shutter blade 14 by the first receptacle 22 is approximately 2,000 Gs. Moreover, if the gap between the moving and stationary parts of the actuator cells is reduced to 0.2 µm, the acceleration imparted to the shutter blade 14 increases to about 200,000 Gs. The resulting initial velocity V of the shutter blade 14 as it separates from the actuator receptacle 22 can then easily exceed 1 m/second, which is sufficient to close, for example, a 2 mm diameter light aperture 30 in 2 ms.

As illustrated in FIG. 4A, after the shutter blade 14 leaves contact with the first receptacle 22 of the stage 25 of the actuator 12, it then continues along the first arcuate trajectory as defined by the first flexure 16. At the end of the first trajectory, i.e., the final blade position, the shutter blade 14 completely obscures the light aperture 30, and in one exemplary embodiment, is then arrested and temporarily held in that final position by a second receptacle 32, or blade arrester and brake, as illustrated in FIG. 4A. To this end, the second receptacle 32 is applied with an electrostatic charge that is opposite to that on the shutter blade 14, such that the blade is electrostatically attracted to it. Finally, when the attracting electrostatic charge is removed, or discharged, from the second receptacle 32, the resilient flexure 16 swings the shutter blade 14 back along the first trajectory and into its initial, starting position in contact with the first receptacle 22, as illustrated in FIGS. 2A and 5A.

Although the exemplary shutter mechanism 10 is described above and illustrated herein as using electrostatic propulsive means, it should be understood that the impulse shutter mechanisms of the present invention are not limited to electrostatic means of propulsion, but can be practiced using other type of actuators that are not electrostatic in nature. For example, an electromagnetic actuator may be used. Similarly, piezoelectric, electrostrictive, electro-thermal, or other types of actuation may be used, and in general, most of these latter types of actuation will benefit from the large motion amplification provided by the impulse-driven shutter and actuator arrangements disclosed herein.

Two exemplary alternative actuation embodiments of the shutter mechanism 10 of the present invention are illustrated conceptually in FIGS. 6A-6D and 7A-7D, respectively.

Figure 6A:
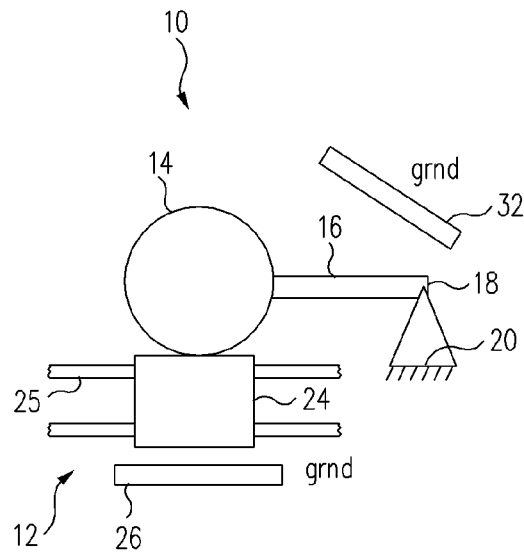
FIGS. 6A-6D are schematic conceptual views of another exemplary shutter mechanism, showing sequential stages of a first alternative embodiment of shutter blade actuation; and, FIGS. 7A-7D are schematic conceptual views of the exemplary shutter mechanism of FIGS. 6A-6D, showing sequential stages of a second alternative embodiment of shutter blade actuation.
Figure 6B:
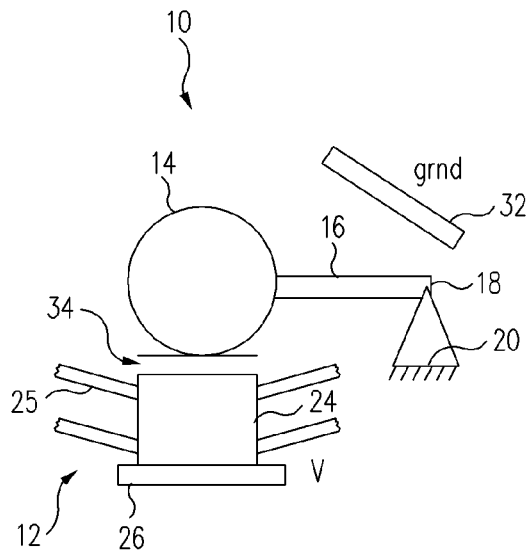
Figure 6C:
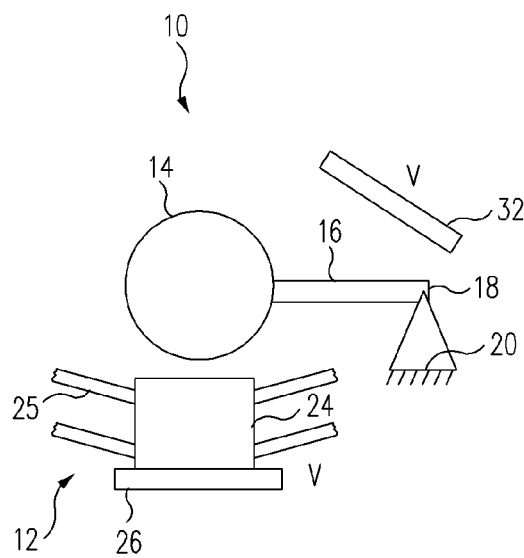
Figure 6D:
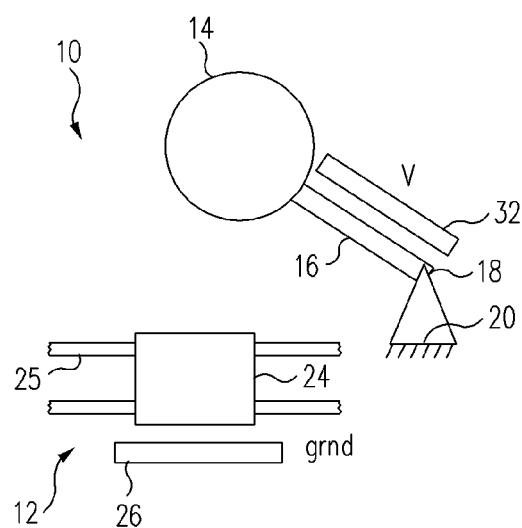

In the actuation embodiment of FIGS. 6A-6D, the shutter mechanism 10 includes an actuator 12 having an impeller or moving mass 24 that is initially disposed in direct contact with the blade 14 of the shutter, as illustrated in FIG. 6A, in a manner similar to the embodiment described above. However, when a voltage V is applied to the mass 24 of the actuator, the mass is attracted to and drawn toward the grounded stationary, or stator part 26 of the actuator, and hence, is pulled away from the blade 14 and against the spring biasing force of one or more flexures 25 coupled to the mass, such that there is a small gap 34 between the two parts, as illustrated in FIG. 6B, and such that potential energy is stored in the spring-mass system defined by the mass 24 and flexures 25. The same actuating voltage, and hence, electrostatic charge, is then applied to the capture mechanism 32, as illustrated in FIG. 6C. Lastly, the moving mass 24 of the actuator is grounded, causing the potential energy stored in the flexures 25 of the mass to be converted to kinetic energy and the mass to be accelerated thereby towards the shutter blade 14 and to impact it, thereby imparting at least some of the momentum, or kinetic energy, of the moving mass 24 to the shutter blade 14 and impelling the latter away from the mass and towards the blade brake and capture mechanism 32. The brake and capture mechanism arrests the movement of the blade and holds it in the arrested position by means of the electrostatic attractive force imposed thereon by the voltage V, as illustrated in FIG. 6D.

Figure 7A:
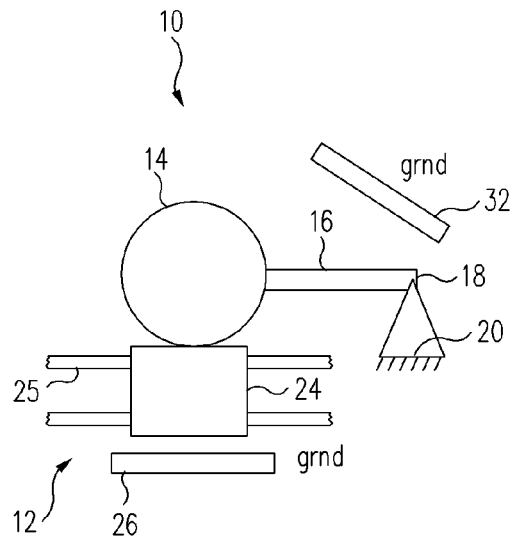
Figure 7B:
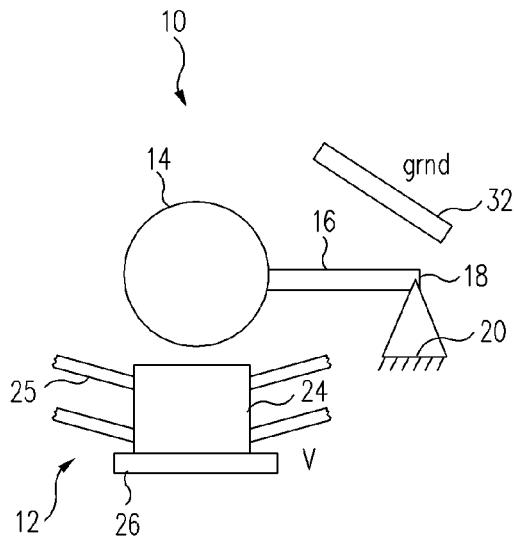
Figure 7C:
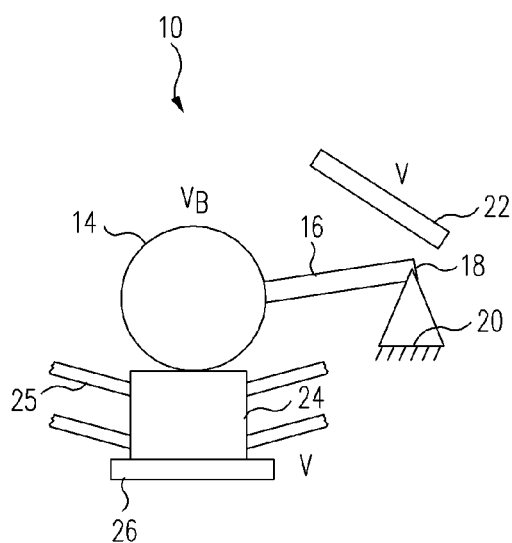
Figure 7D:
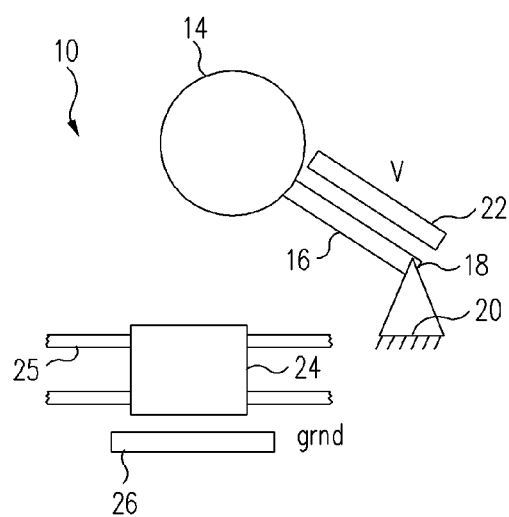

The operation of the exemplary shutter mechanism 10 illustrated conceptually in FIGS. 7A-7D is similar to that of the impulse shutter of FIGS. 6A-6D, except for the following differences. In this alternative embodiment, the impeller or moving mass 24 of the actuator 12 also starts in contact with the shutter blade 14, as illustrated in FIG. 7A, and as described above in connection with the embodiment of FIGS. 2A-5B. When a voltage V is applied to the stator 26 of the actuator, the impeller or mass 24 is attracted to the stator and begins to pull away from the blade and against the spring force of the flexures 25, as illustrated in FIG. 7B. However, in this alternative embodiment, the shutter blade 14 is also biased with a voltage $V_B$, and hence, electrostatic charge, having a polarity opposite to that of the mass 24, so that the blade is attracted to the mass, and therefore, follows the withdrawing mass, as illustrated in FIG. 7C. When the stator 26 of the actuator 12 is then grounded, the mass 24, still in close contact with the shutter blade 14, propels the blade to the closed position as before, where it is arrested and held by the capture mechanism 32, as illustrated in FIG. 7D. However, like the embodiment of FIGS. 2A-5B, and unlike the embodiment of FIGS. 6A-6D described above, the mass 24 is not spaced apart from the shutter blade 14 when it is released, and therefore, does not impact at a relatively high velocity upon the blade, but instead, simply pushes against the blade so as to accelerate the latter to the final velocity of the mass, thereby avoiding any potential damage that might occur from an impact between the moving mass and the blade.

As those of skill in this art will by now appreciate, many modifications, substitutions and variations can be made in and to the materials, methods and configurations of the impulse actuated MEMS shutter mechanisms of the present invention without departing from its spirit and scope. Indeed, this type of MEMS actuation may also be applied to other applications, either moving another type of optical element or non-optical element. Accordingly, the scope of this invention should not be limited to that of the particular exemplary embodiments illustrated and described herein, which are only by way of some examples thereof, but instead, should be commensurate with that of the claims appended hereafter and their functional equivalents.

What is claimed is:

1. A device, comprising:
   an element disposed at a first end of an elongated flexure, the flexure having an opposite second end fixed so as to constrain movement of the element along a first trajectory and between opposite initial and final element positions;
   an actuator, comprising a stator and a stage supported for movement relative to the stator along a second trajectory intersecting the first trajectory at the initial element position and between opposite initial and final stage positions; and,
   an apparatus for accelerating the stage along the second trajectory and against the element such that at least some of the momentum of the stage is imparted to the element and causes the element to move along the first trajectory and from the initial element position to the final element position.

2. The device of claim 1, further comprising an apparatus disposed at the final element position and operable to arrest and releasably hold the element in the final element position.

3. The device of claim 2, wherein the flexure is operable to return the element from the final element position to the initial element position and further comprising an apparatus for releasing the element from the element arrest and hold apparatus.

4. The device of claim 1, wherein the second trajectory is substantially shorter than the first trajectory.

5. The device of claim 1, wherein the stage accelerating apparatus is motivated at least in part by one or more of electrostatic, electromagnetic, piezoelectric, electrostrictive, or electrothermal forces.

6. The device of claim 1, wherein the element and the stage are in contact with each other when respectively disposed in the initial element and stage positions.

7. The device of claim 1, wherein the element and the stage are spaced apart from each other when respectively disposed in the initial element and stage positions.

8. The device of claim 1, wherein the element comprises one or more of an optical element or a non-optical element, and wherein the device comprises an impulse actuated MEMS device.

9. The device of claim 1, wherein the flexure is operable to return the element from the final element position to the initial element position.

10. A camera incorporating the device of claim 1.

11. An electronic device incorporating the camera of claim 10.

12. The electronic device of claim 11, wherein the electronic device comprises a cellular telephone, a laptop computer, or a personal digital assistant.

13. A method for actuating an element, the method comprising:
    disposing the element at a first end of an elongated flexure, the flexure having an opposite second end fixed so as to constrain movement of the element along a first trajectory and between opposite initial and final element positions; and,
    accelerating a mass against the element such that at least a portion of the momentum of the mass is imparted to the element and causes the element to move along the first trajectory and from the initial element position to the final element position.

14. The method of claim 13, wherein the accelerating comprises:
    biasing the mass against a spring such that potential energy is stored in the spring and the mass moves away from the initial mass position and to a second initial mass position; and,
    releasing the mass from the second initial mass position.

15. The method of claim 14, further comprising applying a biasing force to the element such that the element is attracted to the mass and follows the mass to the second initial stage position.

16. The method of claim 13, further comprising:
    arresting and holding the element in the final element position for a selected period of time; and,
    releasing the element from the final element position such that the flexure returns the element from the final element position to the initial element position.

17. An impulse actuated MEMS device, comprising:
    an element integrally formed at a first end of an elongated flexure having an opposite second end fixed so as to constrain movement of the element along a planar, arcuate first trajectory and between opposite initial and final positions;
    an actuator, comprising a stator and a stage supported above the stator for parallel movement relative to the stator along a second trajectory coplanar with and intersecting the first trajectory at the initial element position, each of the stator and the stage having a plurality of electrodes disposed on respective opposing surfaces thereof; and,
    an apparatus for selectably applying electrostatic charges to the respective electrodes of the stator and the stage such that the stage is accelerated along the second trajectory and against the element and thereby imparts momentum to the element that causes the element to move along the first trajectory and from the initial position to the final position.

18. The MEMS device of claim 17, further comprising:
    a receptacle disposed at the final element position and configured to receive the element; and,
    an apparatus for applying an electrostatic charge to the receptacle such that the receptacle attracts the element and arrests and holds the element in the final element position.

19. The MEMS device of claim 18, wherein one or more of the element, the flexure, the stator, the stage or the receptacle is formed by micromachining.

20. The MEMS device of claim 19, wherein the micromachining comprises one or more of photolithography or etching.

21. The MEMS device of claim 18, wherein one or more of the element, the flexure, the stator, the stage or the receptacle comprises a semiconductor.

22. A digital camera, comprising:
an array of photosensitive pixels;
optics, including a light aperture, disposed coaxially along an optical axis in front of the array and operable to selectably admit light from a subject and onto the array; and,
an impulse actuated MEMS device, comprising:
  an optical element disposed at a first end of an elongated flexure, the flexure having an opposite second end fixed so as to constrain movement of the element to movement along a first trajectory and between an initial position spaced apart from the optical axis and a final position coincident with the optical axis;
  an actuator, comprising a stator and a stage supported for movement relative to the stator and along a second trajectory intersecting the first trajectory at the initial position; and,
  an apparatus for accelerating the stage along the second trajectory and against the optical element such that at least some of the momentum of the stage is imparted to the optical element and causes the element to move along the first trajectory and from the initial position to the final position.

23. The camera of claim 22, wherein the stage of the actuator is accelerated by one or more of electrostatic, electromagnetic, piezoelectric, electrostrictive or electro-thermal forces.

24. The camera of claim 22, wherein the MEMS device further comprises a device disposed at the final position and operable to arrest and releasably hold the element in the final position.

* * * * *